(12) United States Patent
Xi et al.

(10) Patent No.: US 9,626,851 B2
(45) Date of Patent: Apr. 18, 2017

(54) TRACKING DEVICE FOR AN OBJECT

(71) Applicant: Hong Kong R & D Centre for Logistics and Supply Chain Management Enabling Technologies Limited, Pok Fu Lam (HK)

(72) Inventors: Jing Tian Xi, Pok Fu Lam (HK); Terry Tao Ye, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 18 days.

(21) Appl. No.: 13/835,772

(22) Filed: Mar. 15, 2013

(65) Prior Publication Data
US 2014/0266610 A1    Sep. 18, 2014

(51) Int. Cl.
*G06K 19/077* (2006.01)
*G08B 13/24* (2006.01)
*G06K 19/07* (2006.01)
*G06Q 10/08* (2012.01)
*G06K 17/00* (2006.01)

(52) U.S. Cl.
CPC ....... *G08B 13/2462* (2013.01); *G06K 19/077* (2013.01); *G06K 19/0723* (2013.01); *G06K 19/0772* (2013.01); *G06K 2017/0045* (2013.01); *G06Q 10/0833* (2013.01); *G08B 13/24* (2013.01); *Y10T 29/49018* (2015.01)

(58) Field of Classification Search
CPC ................ G08B 13/24; G08B 13/2462; G06K 19/0723; G06K 19/077; G06K 2017/0045; G06Q 10/0833
USPC ............ 235/492; 248/27.1; 340/8.1; 411/192
See application file for complete search history.

(56) References Cited

U.S. PATENT DOCUMENTS

2010/0288843 A1* 11/2010 Arnesen et al. .............. 235/492

FOREIGN PATENT DOCUMENTS

| GB | WO 0207084 A1 | * | 1/2002 | .......... B65D 5/4233 |
| WO | WO 0129761 A1 | * | 4/2001 | |
| WO | WO 0207084 A1 | * | 1/2002 | |

* cited by examiner

*Primary Examiner* — Steven Lim
*Assistant Examiner* — Benyam Haile
(74) *Attorney, Agent, or Firm* — Renner, Kenner, Greive, Bobak, Taylor & Weber Co. LPA

(57) ABSTRACT

A tracking device for an object comprising a body having at least one engagement member adapted to engage with the object, and a tracking arrangement chamber for housing a tracking arrangement arranged to track the object engaged with the body, wherein the tracking arrangement includes an antenna disposed adjacent to the body.

7 Claims, 3 Drawing Sheets

TRACKING DEVICE FOR AN OBJECT

TECHNICAL FIELD

The present invention relates to a tracking device for an object and particularly, although not exclusively, to a tracking device for a unit load device (ULD).

BACKGROUND

Being unable to track, locate or identify an object in a timely manner on demand is a particularly frustrating yet common scenario in everyday life. For example, a traveller may want to locate his luggage on the conveyer belt in an airport to proceed to checkout, but he may not be able to locate his luggage as the luggage may have been lost during the transportation process. This is very inconvenient to the traveller as the retrieval of the luggage may take a long period of time or even be to no avail.

Another example relates to a customer who purchases products at a grocery store and requests for delivery for some or all of the products at a later time. In some occasions, the order may not be delivered at the predetermined time due to traffic reasons or a wrong delivery address. As a result, the customer who cannot receive his purchases may enquire the staff of the grocery store about the status of the delivery or the location of the products. Sometimes, the staff may not be able to provide these information in a timely manner. Thus, making an object to become readily trackable may offer an alternative solution to these problems.

Unit load devices (ULD) are commonly used in vehicles such as airplanes, cars or ships for transporting goods and cargo items from one destination to another. A unit load device (ULD) usually comprises a plate which is used to support cargo items that are loaded onto the plate. The cargo items on the plate are further secured by use of a net which in turn may be engaged with the plate through a plurality of load bearing double studs. With an ever increasing volume of goods and cargo items to be processed in supply chain logistics, the ability to track and identify these objects is of paramount importance.

SUMMARY OF INVENTION

In accordance with a first aspect of the present invention, there is provided a tracking device for an object comprising: a body having at least one engagement member adapted to engage with the object; and a tracking arrangement chamber for housing a tracking arrangement arranged to track the object engaged with the body, wherein the tracking arrangement includes an antenna disposed adjacent to the body.

In an embodiment of the first aspect, the tracking arrangement mates with the body such that the antenna of the tracking arrangement is in contact with an outer surface of the body.

In an embodiment of the first aspect, the antenna is substantially planar or it is arranged to conform to the outer contour of the body.

In an embodiment of the first aspect, the tracking arrangement is disposed in the tracking arrangement chamber.

In an embodiment of the first aspect, the tracking arrangement chamber is integrally formed within the body.

In an embodiment of the first aspect, the antenna is integrated with the body.

In an embodiment of the first aspect, the tracking arrangement communicates by means of radiofrequency (RF) signals.

In an embodiment of the first aspect, the tracking arrangement is an RFID device.

In an embodiment of the first aspect, the tracking arrangement is a passive RFID device.

In an embodiment of the first aspect, the body is a double stud.

In an embodiment of the first aspect, the body is made of a non-interfering material arranged to be non-interfering with the communication of the tracking arrangement.

In an embodiment of the first aspect, the body is made of a non-metallic material.

In an embodiment of the first aspect, the body is made of a plastic material.

In an embodiment of the first aspect, the engagement member includes a shoulder arranged to engage with a track of the object.

In an embodiment of the first aspect, the object is a unit load device (ULD).

In accordance with a second aspect of the present invention, there is provided a method for tracking an object comprising the steps of: attaching the tracking device in accordance with one embodiment of the first aspect to the object; and communicating with the tracking device to determine the location of the object.

In an embodiment of the second aspect, the step of attaching the tracking device to the object includes engaging the shoulder of the engagement member of the tracking device with a track of the object.

In an embodiment of the second aspect, the step of communicating with the tracking device further comprises transmitting and/or receiving radiofrequency (RF) signal to and/or from the tracking arrangement of the tracking device.

In accordance with a third aspect of the present invention, there is provided a method for manufacturing a tracking comprising the steps of: moulding a body of a tracking device such that a tracking arrangement chamber and an engagement member is integrally formed within the body; and affixing a tracking arrangement to the body such that an antenna of the tracking arrangement is in contact with an outer surface of the body and the tracking arrangement is housed in the tracking arrangement chamber.

In accordance with a fourth aspect of the present invention, there is provided a double stud member for a unit load device (ULD) comprising: a body having at least one engagement member adapted to engage with the unit load device (ULD); and a RFID device chamber for housing an RFID device arranged to track the unit load device (ULD) engaged to the body, wherein the RFID device includes an antenna disposed adjacent to the body.

In an embodiment of the fourth aspect, the RFID device mates with the body such that the antenna of the RFID device is in contact with an outer surface of the body.

In an embodiment of the fourth aspect, the antenna substantially conforms to the contour of an outer surface of the body.

In an embodiment of the fourth aspect, the RFID device is disposed in the RFID device chamber.

In an embodiment of the fourth aspect, the RFID device chamber is integrally formed within the body.

In an embodiment of the fourth aspect, the antenna is integrated with the body.

In an embodiment of the fourth aspect, the body is made of a non-interfering material arranged to be non-interfering with the communication of the RFID device.

In an embodiment of the fourth aspect, the body is made of a non-metallic material.

In an embodiment of the fourth aspect, the body is made of a plastic material.

In an embodiment of the fourth aspect, the engagement member includes a shoulder arranged to engage with a track of the unit load device (ULD).

In an embodiment of the fourth aspect, the RFID device is a passive RFID device.

BRIEF DESCRIPTION OF THE DRAWINGS

Embodiments of the present invention will now be described, by way of example, with reference to the accompanying drawings in which.

DETAILED DESCRIPTION OF THE INVENTION

Figure 1A:
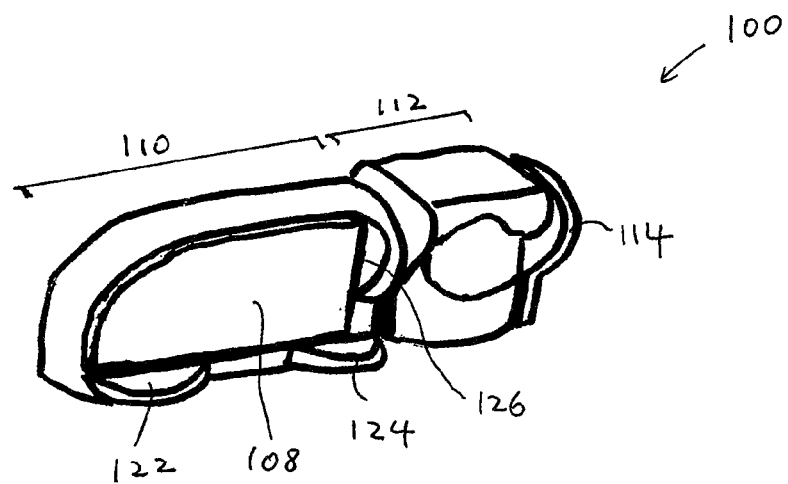
FIG. 1A is a perspective view of a tracking device with one embodiment of the present invention.

Referring to FIGS. 1A, 1B, 2A and 2B, there is provided a tracking device 100 for an object comprising a body 102 having at least one engagement member adapted to engage with the object; and a tracking arrangement chamber 104 for housing a tracking arrangement 106 arranged to track the object engaged with the body 102, wherein the tracking arrangement 106 includes an antenna 108 disposed adjacent to the body 102.

Figure 1B:
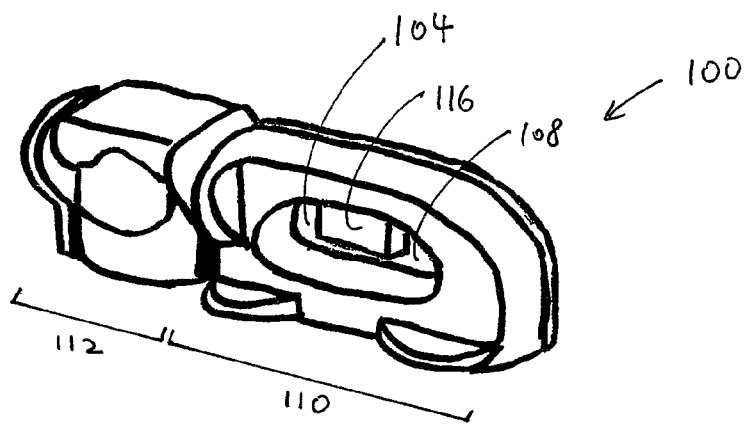
FIG. 1B is another perspective view of a tracking device of FIG. 1A.

In this embodiment, the body 102 of the tracking device 100 resembles the shape of a double stud which may be engaged with a unit load device (ULD) loaded with cargo items. Alternatively, in other embodiments, the tracking device 100 may be of any other shape or structure. As shown in FIGS. 1A and 1B, the body 102 of the tracking device 100 comprises a front section 110 and an end section 112.

In this example, the front section 110 comprises an integrally formed chamber 104 for housing a tracking arrangement 106 whilst the end section 112 comprises an engagement plate 114. In some embodiments, the chamber 104 may be a hole through the body 102 or an opening that does not penetrate through the body 102. In other embodiments, the chamber 104 or the engagement plate 114 may be formed on any other parts of the body 102 and they may have any other shape or structure.

Preferably, as shown in this embodiment, a plurality of shoulder members is located in the front section 110 of the body 102. These shoulder members may be used to engage the tracking device 100 with the object. In other embodiments, other engaging means may be formed on the body 102 to facilitate the engagement of the tracking device 100 with the object to be tracked.

As shown in FIGS. 1A, 1B, 2A and 2B, the tracking arrangement 106, in this embodiment, has a substantially planar antenna 108 which may be engaged with the front section 110 of the body 102 and an electric circuit board 116 disposed on an inner surface 118 of the planar antenna 108. The planar antenna 108 may be a metallic antenna arranged to facilitate transmit or receive of electromagnetic communications signals and is preferably integrated to the body by being formed to conform with the outer surface of the body.

The tracking arrangement 106 may facilitate the tracking of the object of which the tracking device 100 is engaged with. Details of the operation and function of the tracking arrangement 106 will be provided below. In this embodiment, the tracking arrangement 106 is an RFID device that may communicate with an external device by means of radiofrequency (RF) signals. Preferably, the RFID device is a passive RFID device although in some other embodiments, the tracking arrangement may be of any other form or structure.

Figure 2A:
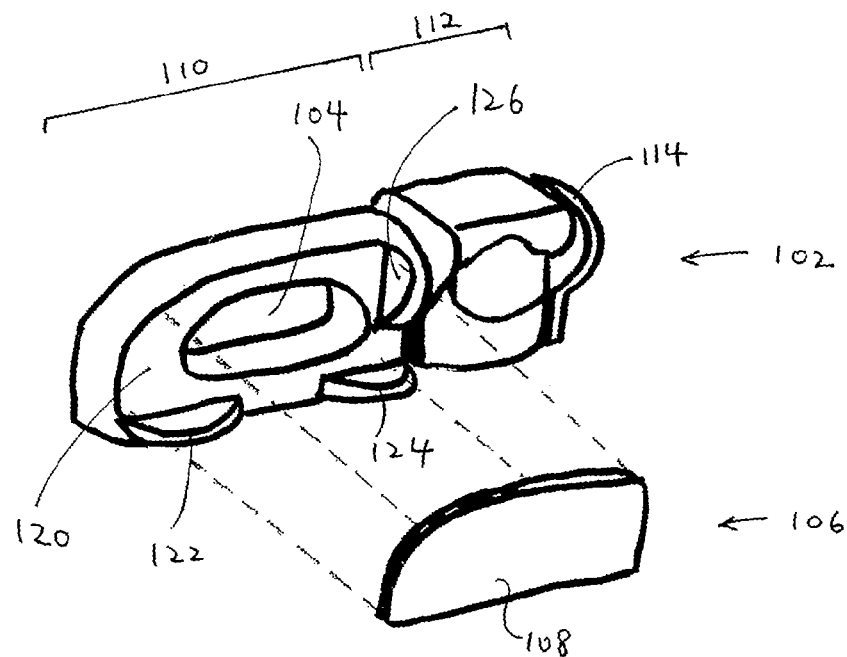
FIG. 2A is an exploded view of the tracking device of FIG. 1A.
Figure 2B:
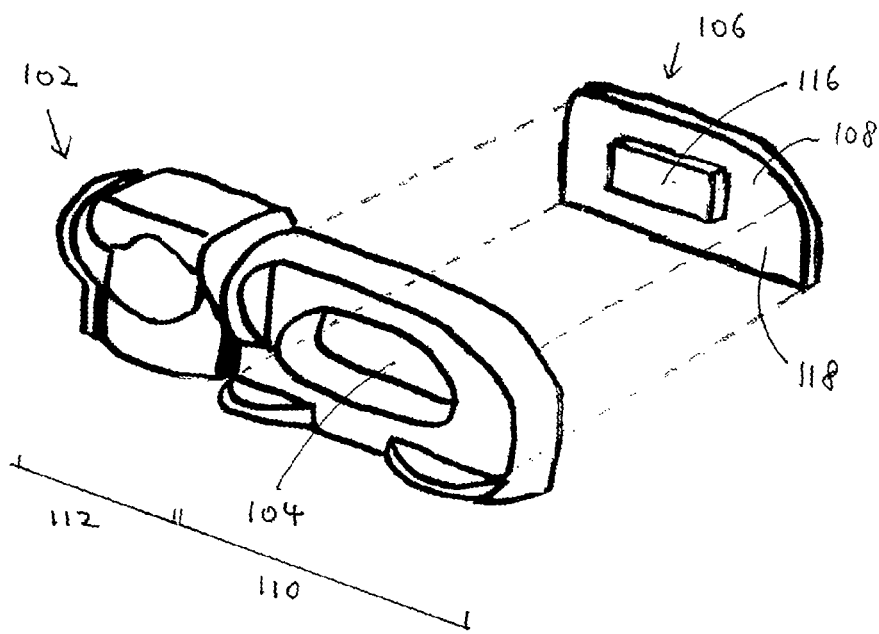
FIG. 2B is another exploded view of the tracking device of FIG. 2A.

As shown in FIGS. 2A and 2B, an inner surface 118 of the antenna 108 is disposed adjacent to an outer surface 120 in the front section 110 of the body 102 such that the antenna 108 is integrated with the profile of the body 102. This is advantageous in that the tracking device 100 may be substantially free of unwanted protruding parts resulting from the integration of the tracking arrangement 106 with the body 102. In this embodiment, the body 102 of the tracking device 100 includes a first shoulder 122, a second shoulder 124 and a third shoulder 126. These shoulder members together defines a boundary of the area for which the planar antenna 108 may engage with the body 102. In other embodiments, any other bounding members with different structure or shape may be used. As shown in FIG. 1B, in this embodiment, after the tracking arrangement 106 is integrated with the body 102, the protruding section 116 of the tracking arrangement 106 may be housed within the chamber 104 of the body 102. This may be advantageous for protecting the protruding section 116 of the tracking arrangement 106 and hence may reduce the chance of unwanted damage to the tracking arrangement 106.

In one embodiment, the body 102 and the tracking arrangement 106 is formed together during the manufacturing process. Preferably, the body 102 is made of non-interfering material such as, but not limited to, non-metallic material or plastic polymer materials. More preferably, these materials may have minimal interference to the communication of the tracking arrangement 106. In some embodiments, the body 102 is made to be non load bearing. In other embodiments, the body 102 may be made of a stronger and more rigid non-interfering material that allows the body 102 to bear a load such as to tie down a net for securing items loaded on the object. As mentioned earlier, in this embodiment, the tracking arrangement 106 may be an RFID device which may be made of a electric circuit board with a controller and a communication port.

The manufacturing process of the tracking device 100 may comprise a series of steps. Firstly, the body 102 of the tracking device 100 may be moulded with non-interfering materials such that a chamber 104 and one or more engagement members may be integrally formed within the body 102 whilst ensuring the body 102 itself does not interfere with the electromagnetic communication signals transmitting to or from the tracking arrangement 106. Secondly, the tracking arrangement 106 may be affixed to the body 102 whereas the antenna of the tracking arrangement 106 may be adjusted so as to be in contact with an outer surface 120 of the body 102 such that any protruding member of the tracking arrangement 106 may be housed within the chamber 104 of the body 102. This is advantageous as the chance of damaging the tracking arrangement 106 may be largely reduced while the size of the tracking device 100 may be minimized. A further advantage is that the electronic components of the tracking arrangement may be substantially shielded from the external environment that may otherwise induce moisture in the device and hence damage the tracking arrangement. In some other embodiments, the tracking arrangement, as a result of the shielding, may be substantially waterproof.

Figure 3:
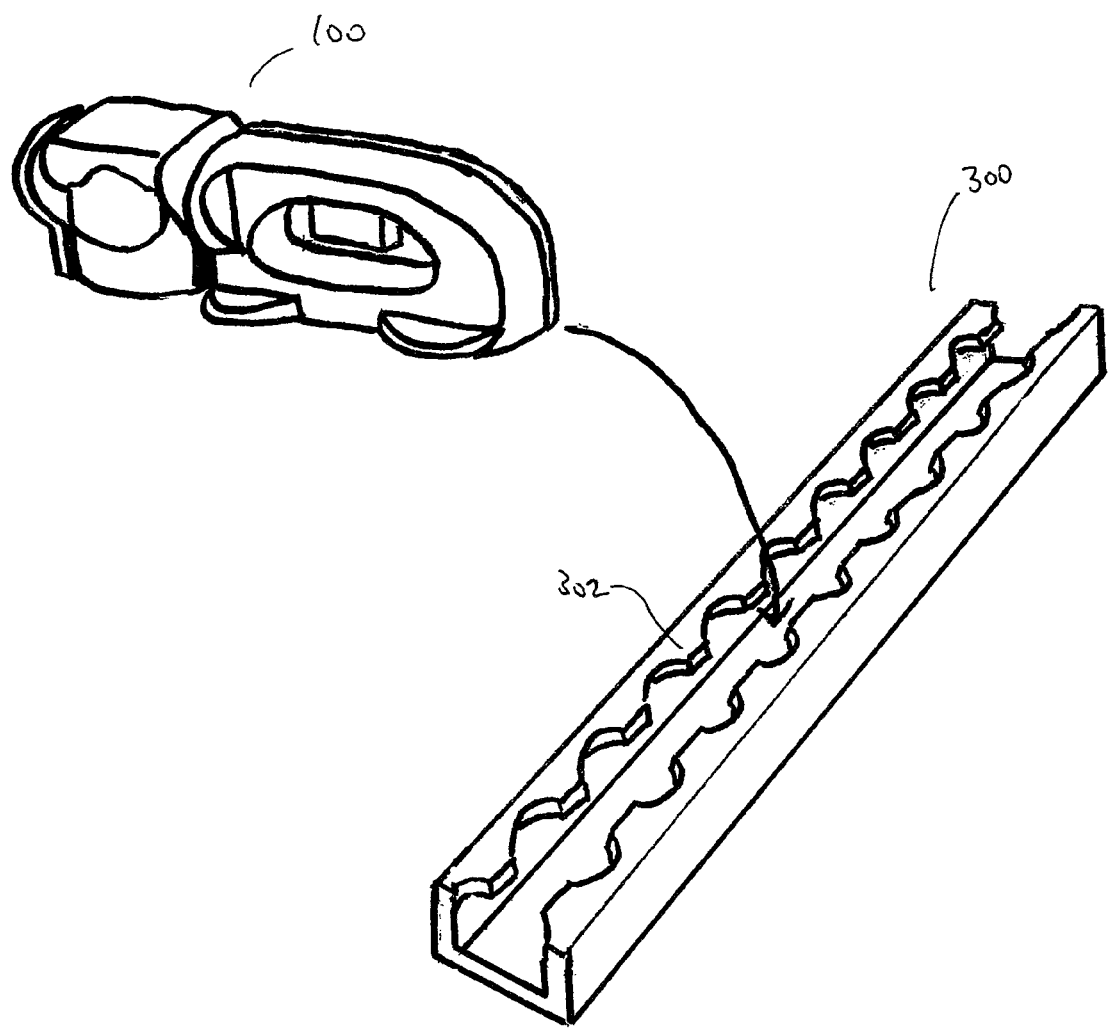
FIG. 3 is an embodiment of a track on a unit load device (ULD) for engaging with the tracking device of FIG. 1A.

During operation, a user engages the tracking double stud 100 of FIGS. 1A and 1B to an object with a track. Preferably, the object to be engaged and tracked is a unit load device (ULD) comprising a plate loaded with cargo items. As shown in the embodiment of FIG. 3, the plate comprises a track 300 of which the tracking double stud 100 may be engaged with. The cargo items on the plate may be secured using a net that substantially encloses all cargo items whilst a plurality of load bearing double studs (that are not used for tracking) lock or engage the net with the track 300 of the plate. Once the tracking double stud 100 is engaged with the track, the first shoulder 122 and the second shoulder 124 of the body 102 of the tracking double stud 100 is located in the track 300. Vertical motion of the tracking double stud 100 (hence the detachment of the tracking double stud from the track) is minimized as the first shoulder 122 and the second shoulder 124 of the body 102 of the tracking double stud 100 engages with the protrusions 302 of the track 300. Alternatively, other engagement members may be used to affix the tracking double stud 100 to the track 300.

For tracking purpose, information related to the cargo items on the unit load device (UDL) may be previously transferred onto the RFID device of the tracking arrangement 106. The information may include the type of cargo items, the expected departure or arrival time, the destination, etc. Particularly, the information may be in the form of an radiofrequency (RF) signal. To transfer the tracking information to the RFID device, an operator may use an RF signal that communicates with the RFID device. Once the transfer of tracking information is completed, the unit load device (ULD) may then be loaded onto a vehicle such as an aircraft, a ship or a car that transfers the cargo items to a predetermined destination. Upon arrival at the destination, the unit load device (ULD) may be unloaded from the vehicle and tracking information can be retrieved from the RFID device by means of a radiofrequency (RF) signal transmitted by another operator.

As the unit load device (ULD) is usually in the form of a plate, there may not be sufficient space for embedding an extra external tracking device. Also, the significant variation in shape, size and form factor of the cargo items makes it very difficult to attach an RFID device to the plate. By using a tracking device in accordance with an embodiment of the invention, the tracking device can be readily embedded in the plate without taking up significant spaces. The unit load device (ULD) with the tracking device in accordance with an embodiment of the invention attached allows the unit load device (ULD) to be wirelessly trackable and identifiable.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A double stud member for a unit load device comprising:
a body having an outer surface, an inner surface, and at least one engagement portion adapted to engage with the unit load device;
an RFID device chamber in the form of a through-hole defined by the inner surface of the body; and
an RFID device formed by a substantially planar antenna and a circuit module disposed on a surface of the planar antenna;
wherein the surface of the planar antenna is arranged to be in direct contact and engage with the outer surface of the body to completely seal an opening of the through-hole, such that the circuit module is arranged to be housed within the RFID device chamber, and a perimeter of the planar antenna is arranged to conform with a contour of the outer surface of the body; and
wherein the RFID device is permanently affixed to and integrated with the outer surface of the body.

2. The double stud member for a unit load device in accordance with claim 1, wherein the antenna is integrated with the body.

3. The double stud member for a unit load device in accordance with claim 1, wherein the body is made of a non-interfering material arranged to be non-interfering with the communication of the RFID device.

4. The double stud member for a unit load device in accordance with claim 1, wherein the body is made of a non-metallic material.

5. The double stud member for a unit load device in accordance with claim 1, wherein the body is made of a plastic material.

6. The double stud member for a unit load device in accordance with claim 1, wherein the engagement portion is a shoulder portion arranged to engage with a track of the unit load device.

7. The double stud member for a unit load device in accordance with claim 1, wherein the RFID device is a passive RFID device.

* * * * *